United States Patent [19]
Iggulden

[11] Patent Number: 5,954,515
[45] Date of Patent: Sep. 21, 1999

[54] PRINTED BOOK AUGMENTED WITH ASSOCIATED ELECTRONIC DATA

[75] Inventor: Jerry Iggulden, Santa Clarita, Calif.

[73] Assignee: Ithaca Media Corporation, La Canada, Calif.

[21] Appl. No.: 08/915,435

[22] Filed: Aug. 20, 1997

[51] Int. Cl.$^6$ .................................................. G06F 17/30
[52] U.S. Cl. ........................................ 434/317; 707/104
[58] Field of Search ............................. 434/307 R, 309, 434/317, 365; 707/104; 364/514 A

[56] References Cited

U.S. PATENT DOCUMENTS

| | | | |
|---|---|---|---|
| 4,855,725 | 8/1989 | Fernandez | 345/173 |
| 4,966,285 | 10/1990 | Otake et al. | 206/455 |
| 5,188,533 | 2/1993 | Wood | 434/169 |
| 5,453,013 | 9/1995 | Billings et al. | 434/169 |
| 5,569,868 | 10/1996 | Leung | 84/600 |
| 5,597,307 | 1/1997 | Redford et al. | 434/118 |
| 5,624,265 | 4/1997 | Redford et al. | 434/307 R |

OTHER PUBLICATIONS

"Action Products Int'l Introduces Educational Book/Software Products," New Product Release @ http://www.techmall.com/techdocs/NP970827-1.html, two pages, Aug. 1997.

"Action Products Int'l to Introduce New Book Series This Spring," Press Release @ http://www.apii.com/ir/press/031497-2pr.html, Mar. 1997.

"Action Products Int'l Unveils Its Growth Plan and New Products," Press Release @ http://www.apii.com/ir/press/052897pr.html., May 1997.

Magdy F. Iskander et al., "Interactive Multimedia Lessons for Education," SBMO/IEEE MTT-S IMOC '95 Proceedings, pp. 693–700, 1995.

Interfact™ product brochure and order form from World Book, Inc. and Two-Can Publishing Ltd., no date (date unknown).

*Web Gallery*, a web page, by Prentice Hall (www.prenhall.com), date unknown.

*Interactive Course Series*, a web page, by Waite Group Press, a division of Macmillan Computer Publishing (www.waite.com), date unknown.

*Primary Examiner*—Paul V. Kulik
*Attorney, Agent, or Firm*—Blakely, Sokoloff, Taylor & Zafman LLP

[57] ABSTRACT

A printed book has associated therewith certain electronically stored data in the form of images, sounds and/or supplemental text. Visual cues are provided to the reader of the book in the vicinity of text having associated electronically stored data. The electronic data is preferably stored in a remotely accessible server. A graphical user interface is provided for controlling access to the data stored in the server. When the reader of the book wishes to access data associated with a portion of the text, the reader uses a computer pointing device to select or manipulate indicia on the graphical user interface corresponding to the visual cue in the book. The server retrieves the appropriate data which is then presented to the reader as images, sounds and/or supplemental text on the reader's computer, thereby providing a multimedia enhanced reading experience.

15 Claims, 1 Drawing Sheet

PRINTED BOOK AUGMENTED WITH ASSOCIATED ELECTRONIC DATA

BACKGROUND OF THE INVENTION

1. Field of the Invention

The present invention relates generally to the field of multimedia publishing. More particularly, the invention pertains to a printed book, the text of which is augmented with associated electronic data stored in a remotely accessible server.

2. Prior Art

As the home computer has matured, there has been a veritable explosion in "multimedia publishing". A vast array of software titles are now available to the computer owner which combine text, images and sounds to provide a multimedia experience. Widespread penetration of CD-ROM drives into home computers has accelerated this process. Multimedia content is also available via the Internet, particularly the World Wide Web.

The public's enthusiasm for computer-based multimedia experiences is seen by many as a threat to more conventional forms of publishing, particularly book publishing. Nevertheless, the experience of reading a book cannot be duplicated with electronic media and reading remains a pleasurable pastime for a great many persons, whether or not they also engage in computer-based entertainment.

There have been several approaches to combining computer-based multimedia experiences with a separate printed text. One particular approach relates to training and educational subjects where a printed course book is provided in combination with multimedia content stored locally on a hard disk, floppy disk or CD-ROM, or remotely accessible via the Internet. While the course book and multimedia materials may parallel one another, a reader of the course book is not provided with any graphic indicia that will direct his or her attention to electronically stored data associated with the text being read at the time.

U.S. Pat. Nos. 5,597,307 and 5,624,265 to Redford, et al. disclose a printed publication having associated electronic content. The printed publication contains one or more buttons which actuate a remote control transmitter within the book. A remote control receiver is coupled to the reader's home computer system. Upon receipt of a remote control signal, electronic content associated with the text of the publication is downloaded from a remote server and presented to the reader on the home computer system. Apart from pressing the button in the printed publication, the reader does not participate in the interface between the home computer system and the remote server. This necessarily limits the interactivity of the interface.

SUMMARY OF THE INVENTION

The present invention provides a system and method for augmenting a printed text with electronically stored data in the form of images, sounds and/or supplemental text. A printed book contains a plurality of pages of text. At least one of the pages is imprinted with a first graphic indicia, such as a symbol or icon. Data associated with the text appearing on that page is preferably stored in a remotely accessible electronic data server. The server may be accessed from a client computer belonging to the reader of the book. A graphical user interface is provided for controlling the access to data stored in the server. The graphical user interface displays second graphic indicia that is visually correlated with the first graphic indicia. The two graphic indicia may be identically the same or may be sufficiently similar so that the reader can unambiguously identify a symbol or icon on the computer screen that corresponds to the symbol or icon appearing in the book. The reader designates or manipulates the graphic indicia appearing on the computer screen using a computer mouse or similar pointing device. The server then retrieves the data associated with the indicia and presents the data to the reader as images, sounds and/or supplemental text on the reader's computer. Alternatively, the reader may be presented with a menu or other secondary graphical user interface to select images, sounds and/or text for presentation.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
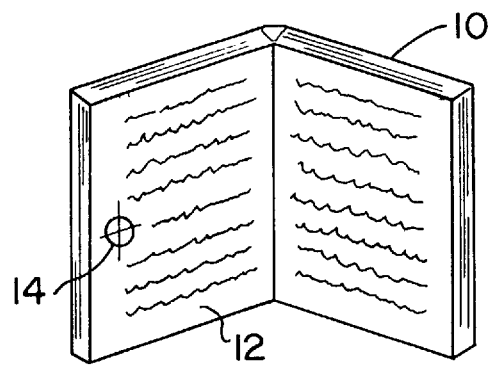
FIG. 1 illustrates a book printed in accordance with the present invention.

FIG. 1 shows a book 10 printed in accordance with the present invention. Book 10 is essentially like an ordinary book, having a plurality of pages 12 containing printed text. Book 10 may be a work of fiction or non-fiction. The subject matter of book 10 is not particularly relevant to the present invention, it being understood that the invention can be advantageously applied to virtually any type of book.

In addition to the normal printed text, book 10 is imprinted with graphic indicia 14 on at least one of pages 12. Indicia 14 appears in the immediate vicinity of text for which there is associated electronically stored data available for retrieval by the book reader. Indicia 14 may take many forms. For example, it may be a symbol or icon appearing in or near the margin of the page. The symbol or icon may be thematically related to the subject matter of the book, but this is not necessarily the case. An example of such a thematic relationship would be the use of a compass rose in a book related to exploration. If indicia 14 appears on a number of pages of book 10, each appearance of the indicia may be the same or slightly different. For example, a compass rose could be used with a pointer that points in a different direction for each appearance of the indicia. This can then be used to direct the reader to the appropriate electronically stored data as explained below.

Indicia 14 may be integrated with the text of the book. For example, one or more words of the text or the page number may be printed in boldface type or in a contrasting font or color. It is merely necessary that indicia 14 be readily apparent to the reader of book 10, but is preferably of a nature that it will not cause the reader undue distraction.

As indicated above, indicia 14 provides a visual cue to the reader that there is electronically stored data associated with the text in the vicinity of the indicia. Such data may be in the form of images, sounds, and/or supplemental text. Image data may comprise maps or photographs showing locales referred to in the text, photographs or illustrations of characters referred to in the text, etc. Sound data may comprise narrations of the text, sound effects associated with events portrayed in the text, mood setting music, etc. Supplemental text data may comprise "sidebars" relating to the text, alternative accounts of events portrayed in the text, unabridged accounts of a condensed text, etc.

Certain types of supplemental text data are unique to the present invention. One example is a "running" synopsis. At various points throughout the printed text, the reader may be prompted to obtain an electronically stored synopsis of the story told up to that point. No information is revealed concerning events that take place beyond the page where the reader accesses the electronically stored data. The synopsis may include the cast of characters introduced thus far, a chronology of events or various other summaries. The reader need not be prompted with graphic indicia to utilize this feature. The electronically stored synopsis may be arranged to be accessed at any corresponding point within the printed text. This can be accomplished by simply entering the page number of the printed text following an appropriate prompt in the user interface.

Figure 2:
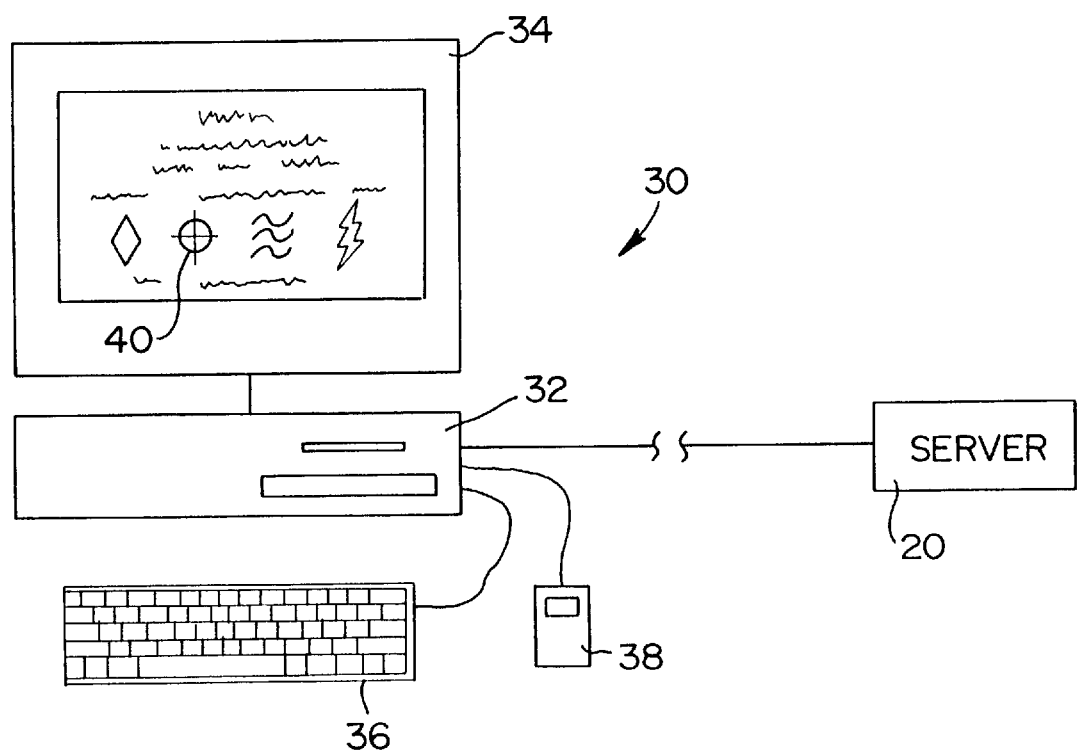
FIG. 2 illustrates a graphical user interface for retrieving text-related data in accordance with the present invention.

Referring next to FIG. 2, the image, sound and/or supplemental text data associated with portions of text in book 10 are stored in a data storage device such as a remote data server 20; however, the invention is not limited in this regard. The data storage device may be local to the client computer in the form of a hard disk, floppy disk, CD-ROM or other data storage medium. In the presently preferred embodiment utilizing remote data server 20, remote access to the server is preferably provided via the World Wide Web. A client computer 30 belonging to the reader of book 10 comprises a processor unit 32, display 34, keyboard 36 and a mouse or equivalent pointing device 38.

To access the data stored in server 20, the reader must first log on to the server. This is accomplished in a conventional manner, but may require validation to ensure that the person logging on possesses a copy of book 10. Such validation may be accomplished by, for example, entering a serial number printed on book 10. Once the reader has successfully logged on, a graphical user interface is presented on display 34. This interface is preferably constructed as a web page using conventional programming techniques. A variety of web pages, each associated with a particular book title, are preferably provided by server 20. The web page for book 10 includes graphic indicia 40 that are visually correlated with the graphic indicia 14 appearing in book 10. To retrieve the data associated with the text in the vicinity of indicia 14, the reader uses pointing device 38 to select indicia 40. Such selection may be accomplished by "clicking on" indicia 40, and may include or be followed by manipulation of the indicia as described below. The reader's actions with respect to indicia 40 are communicated to server 20 which retrieves the associated data and transmits it to processor unit 32. The data is presented to the reader by computer system 30 in the form of images, sounds and/or supplemental text.

It is not necessary that indicia 40 be identical to indicia 14, as long as there is a sufficient visual correlation between the two that the reader can unambiguously select the appropriate indicia. If every appearance of indicia in book 10 is a unique symbol or icon, corresponding symbols or icons are provided on the web page. Alternatively, a commonly formatted symbol or icon may be used throughout book 10. In this case, the web page would be constructed so that indicia 40 leads the reader to further selection options. For example, if indicia 14 is in the form of a compass rose, each appearance of indicia 14 in book 10 may have a pointer pointed in a different direction. The reader would then select indicia 40 on the web page and, using pointing device 38, would rotate the pointer to the proper orientation. Alternatively, indicia 40 may have a "pull-down" menu of various page numbers corresponding to the page numbers in book 10 on which indicia 14 appears.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for augmenting a printed text with electronically stored data comprising the steps of:

providing a printed book containing a plurality of pages of text, at least one of the plurality of pages having a first graphic indicia printed thereon:

providing a data storage device storing data associated with the text on said one of the plurality of pages;

providing a graphical user interface for accessing said data storage device with a computer, said graphical user interface displaying second graphic indicia visually correlated with the first graphic indicia;

designating said second graphic indicia with a pointing device;

retrieving said data stored in the data storage device;

presenting said data on said computer;

wherein the data stored in the data storage device comprises a synopsis of the pages of text preceding said one of the plurality of pages.

2. The method of claim 1 wherein the data storage device is accessed remotely from the computer.

3. The method of claim 2 wherein the data storage device is a data server.

4. The method of claim 3 wherein the data server is accessed via the World Wide Web.

5. A method for augmenting a printed text with electronically stored data comprising the steps of:

providing a printed book containing a plurality of pages of text, at least one of the plurality of pages having a first graphic indicia printed thereon:

providing a data storage device storing data associated with the text on said one of the plurality of pages;

providing a graphical user interface for accessing said data storage device with a computer, said graphical user interface displaying second graphic indicia visually correlated with the first graphic indicia;

designating said second graphic indicia with a pointing device;

modifying a feature of said second graphic indicia with said pointing device;

retrieving said data stored in the data storage device;

presenting said data on said computer.

6. The method of claim 5 wherein said feature of said second graphic indicia is modified to match a corresponding feature of said first graphic indicia.

7. The method of claim 5 wherein said feature of said second graphic indicia comprises a pull-down menu.

8. An information delivery system comprising:

a printed book containing a plurality of pages of text, at least one of the plurality of pages having a first graphic indicia printed thereon;

a data storage device storing data associated with the text on said one of the plurality of pages;

a graphical user interface for accessing said data with a computer said graphical user interface displaying second graphic indicia visually correlated with the first graphic indicia;

means for designating said second graphic indicia;

means for retrieving said data stored in the data storage device;

means for presenting said data on said computer;

wherein the data stored in the data storage device comprises a synopsis of the pages of text preceding said one of the plurality of pages.

9. The information delivery system of claim 8 wherein the data storage device is accessed remotely from the computer.

10. The information delivery system of claim 9 wherein the data storage device is a data server.

11. The information delivery system of claim 10 wherein the data server is accessed via the World Wide Web.

12. A multimedia information system comprising:

a printed book containing sequential information;

a data storage device storing a cumulative summary of said sequential information;

means for accessing said data storage device and for designating a location within said printed book;

means for displaying said cumulative summary of the sequential information up to said designated location within the printed book, but no further.

13. The multimedia information system of claim 12 wherein said cumulative summary comprises a synopsis of the sequential information.

14. The multimedia information system of claim 12 wherein said cumulative summary comprises a cast of characters introduced in the sequential information.

15. The multimedia information system of claim 12 wherein said cumulative summary comprises a chronology of events occurring in the sequential information.

* * * * *